(12) United States Patent
Rydholm et al.

(10) Patent No.: US 8,043,403 B2
(45) Date of Patent: Oct. 25, 2011

(54) DEVICE FOR SUBMERGING MATERIAL INTO LIQUID METAL BY AN ELECTROMAGNETIC STIRRER

(75) Inventors: Bengt Rydholm, Västerås (SE); Erik Svensson, Västerås (SE); Alf Lundström, Västerås (SE); Helmut Hackl, Västerås (SE); Olof Sjödén, Nyköping (SE); Jan-Erik Eriksson, Västerås (SE); Tord Kroon, Västerås (SE); Tord Lindblad, Västerås (SE)

(73) Assignee: ABB AB, Västerås (SE)

( * ) Notice: Subject to any disclaimer, the term of this patent is extended or adjusted under 35 U.S.C. 154(b) by 53 days.

(21) Appl. No.: 12/682,355

(22) PCT Filed: Oct. 9, 2008

(86) PCT No.: PCT/IB2008/002673
§ 371 (c)(1),
(2), (4) Date: Apr. 9, 2010

(87) PCT Pub. No.: WO2009/047624
PCT Pub. Date: Apr. 16, 2009

(65) Prior Publication Data
US 2010/0236362 A1      Sep. 23, 2010

Related U.S. Application Data

(60) Provisional application No. 60/960,668, filed on Oct. 9, 2007.

(51) Int. Cl.
*C22B 9/22* (2006.01)
(52) U.S. Cl. ........................................ 75/10.67; 266/234
(58) Field of Classification Search ............... 75/10.67; 266/234
See application file for complete search history.

(56) References Cited

U.S. PATENT DOCUMENTS 5,385,338 A * 1/1995 Sato et al. ............... 266/234
5,456,452 A * 10/1995 Soofi ........................ 266/200

FOREIGN PATENT DOCUMENTS
GB         2266896 A      11/1993

OTHER PUBLICATIONS

PCT/ISA/210—International Search Report—Jan. 29, 2009.
PCT/ISA/237—Written Opinion of the International Searching Authority—Jan. 29, 2009.

* cited by examiner

*Primary Examiner* — George Wyszomierski
*Assistant Examiner* — Tima M McGuthry Banks
(74) *Attorney, Agent, or Firm* — Venable LLP; Eric J. Franklin

(57) ABSTRACT

A furnace plant including at least one furnace vessel comprising side walls, a bottom and a roof. At least one heater is configured to heat metal in the furnace vessel. A compartment includes sidewalls lined with refractory material. The compartment forms an extension of the furnace vessel. At least one electromagnetic stirrer is arranged outside and adjacent to the compartment. A refractory plate is arranged inside the compartment. The refractory plate includes an upper edge configured to be positioned below a meniscus of molten metal and includes a lower edge positioned spaced apart from a bottom of the compartment. The plate is arranged such that a gap between the plate and a wall of the compartment increases toward the bottom of the compartment.

22 Claims, 6 Drawing Sheets

DEVICE FOR SUBMERGING MATERIAL INTO LIQUID METAL BY AN ELECTROMAGNETIC STIRRER

CROSS-REFERENCE TO RELATED APPLICATION

This application is a 371 of PCT/IB2008/02673 filed on Oct. 9, 2008, which claims priority to U.S. provisional patent application Ser. No. 60/960/668 filed Oct. 9, 2007.

FIELD OF THE INVENTION

The invention relates to melting metal in a metal furnace for casting. The invention is useful in melting a number of metals and is particularly useful in melting aluminum.

BACKGROUND OF THE INVENTION

Typically, when metal is melted for casting, material floats to the surface of the molten metal and is oxidized. Oxidized material acts as a contaminant in the subsequently cast metal, having such side effects as weakening the metal and providing the case metal with other unfavorable characteristics. To address this issue, special furnaces and mechanical stirrers have been developed.

SUMMARY OF THE INVENTION

Embodiments of the invention address the issue of floating material by providing a device that permits scrap and other material to be submerged under the surface of molten metal, thereby protecting the scrap and other material from oxidation.

Aspects of the invention related to a furnace plant including at least one furnace vessel comprising side walls, a bottom and a roof. At least one heater is configured to heat metal in the furnace vessel. A compartment including sidewalls lined with refractory material forms an extension of the furnace vessel. At least one electromagnetic stirrer is arranged outside and adjacent to the compartment. A refractory plate is arranged inside the compartment. The refractory plate includes an upper edge configured to be positioned below a meniscus of molten metal. The refractory plate also includes a lower edge positioned spaced apart from a bottom of the compartment. The refractory plate is arranged such that a gap between the plate and a wall of the compartment increases toward the bottom of the compartment.

Aspects of the invention also relate to a method for submerging material into liquid metal. Solid parts of metal are fed into a melt pool of liquid metal inside a compartment including sidewalls. The compartment forms an extension to a furnace vessel. A refractory plate is arranged in the compartment such that a gap between the plate and a wall of the compartment increases toward the bottom of the compartment. An electromagnetic force is applied to the liquid aluminium in the compartment with a magnetic field generated by an electromagnetic stirrer installed near the sidewalls or near the bottom of the compartment.

Further objectives and advantages, as well as the structure and function of exemplary embodiments will become apparent from a consideration of the description, drawings, and examples.

BRIEF DESCRIPTION OF THE DRAWINGS

Embodiments of the invention will now be described, by way of example only, with particular reference to the accompanying drawings in which.

DETAILED DESCRIPTION OF EMBODIMENTS OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention.

In melting metal in a furnace for casting, it is desirable to evenly heat the metal and to prevent formation of dross and/or inclusion of dross in the molten metal. For example, metal chips, swarf and other alloy elements may accumulate on the surface of the molten metal where they may be oxidized. This can reduce yield.

The invention concerns a structure and method that can reduce or eliminate such problems. To address these problems, the invention includes a structure and method that helps to stir molten metal, introduce solid metal into the molten metal and help to prevent introduction of unwanted materials into the molten metal. A structure according to the invention includes more or less typical furnace structure having an additional compartment extending therefrom. At least one stirrer is arranged to stir molten metal within the compartment. A plate arranged in the compartment helps to control the flow of molten metal into the compartment from the furnace vessel and out of the compartment into the furnace vessel.

Figure 1:
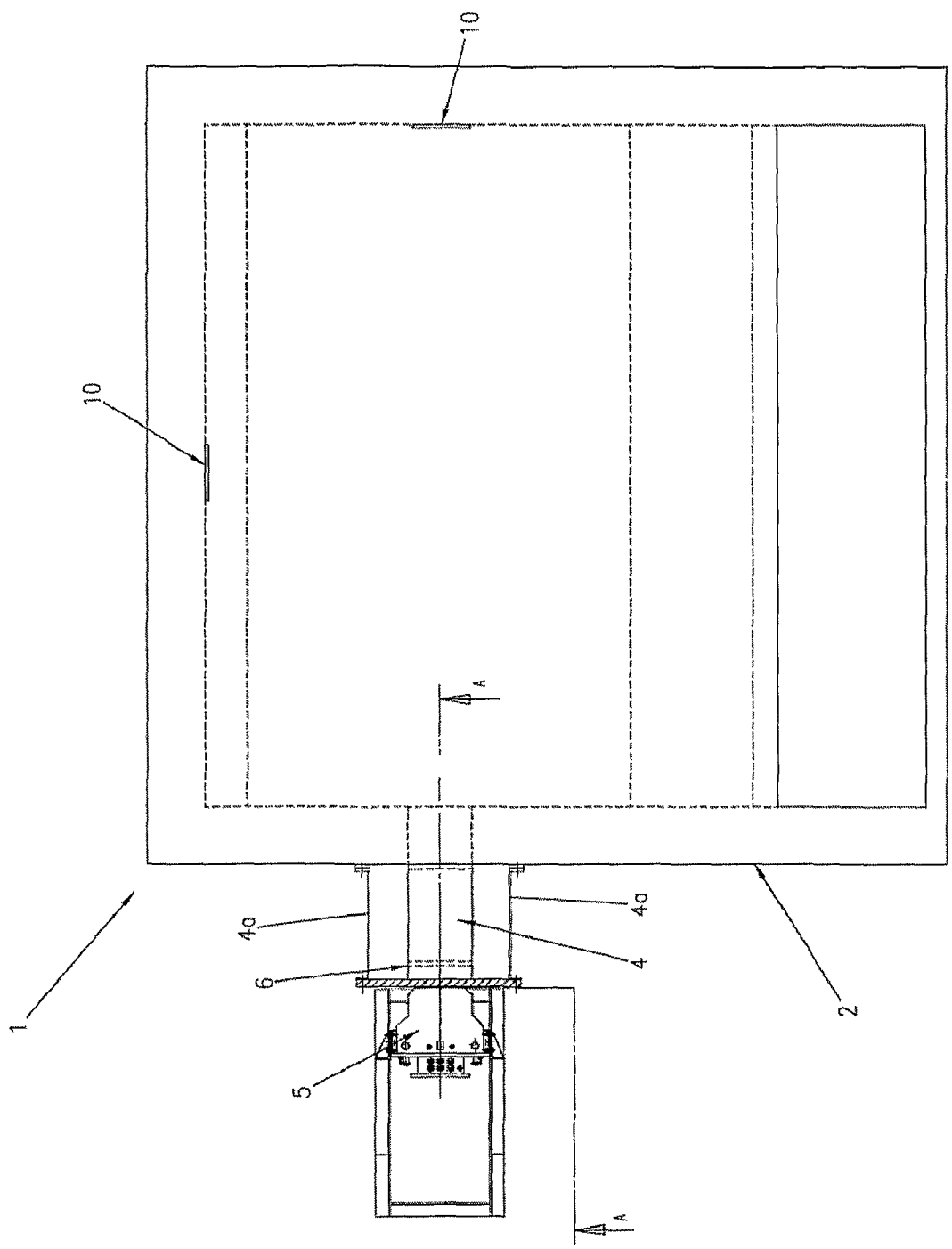
FIG. 1 represents an overhead view of an embodiment of a furnace plant according to the invention.

FIG. 1, illustrates an embodiment of a furnace plant according to the invention. The embodiment of the furnace plant shown in FIG. 1 includes a furnace vessel 1. The furnace vessel includes side walls 2, a bottom 3 and a roof (not shown). During operation, molten metal is contained within the interior space of the furnace plant.

The metal may be heated by at least one heater 10. The heater may operate using to a variety of fuels, such as gas and/or electricity. The heater heats the metal by radiation and/or convection. The heat from the heater maintains molten metal in a liquid state and melts solid metal into a molten state. The at least one heater may be arranged in a variety of locations to achieve effective heating of the metal and melting of solid metal.

The at least one heater could be arranged anywhere around the furnace vessel. For example, the at least one heater could be arranged at any of the walls. The embodiment shown in FIG. 1 includes two heaters, one arranged at two different walls of the furnace vessel. Other locations that one or more heaters could be arranged include the bottom or roof of the furnace vessel. The furnace plant may include as many heaters as necessary. The heater may be arranged at any locations about the furnace vessel. For example, a heater could be arranged at two different walls of the furnace vessel, or at the roof and a wall of the furnace vessel, for example.

A furnace plant according to the invention also includes one or more compartments that extend from the furnace vessel. Each compartment includes an interior space that is continuous with the interior space of the furnace plant, such that molten metal may flow between the furnace and the compartment as described below. The compartment(s) could be arranged anywhere about the furnace vessel to facilitate operation of the device.

The compartment(s) could have any desired size. Typically, the compartment(s) has a small size with respect to the furnace vessel. This can help to concentrate the force on the surface material.

The invention is particularly useful with aluminum. However, it may be useful in casting other metals, such as lead, copper and zinc. Embodiments of the invention may be utilized with any metal where it is desired to submerge a surface layer during melting of the metal.

Figure 2:
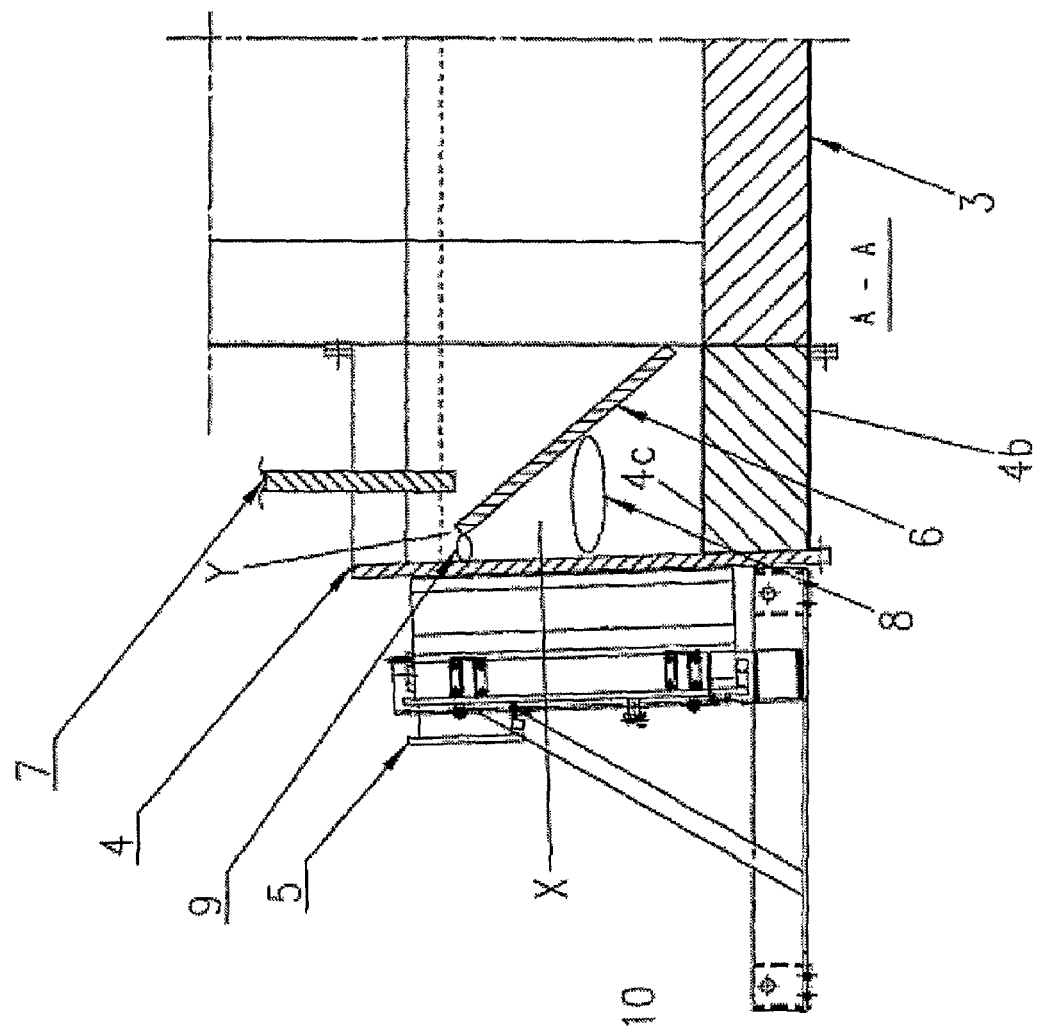
FIG. 2 shows a cross-sectional view of a portion of the embodiment shown in FIG. 1 along, the line A-A.

The compartment may be attached to, or be formed as an integral part of a furnace. The embodiment of the furnace plant illustrated in FIGS. 1 and 2 includes one compartment 4 that extends from the furnace vessel 1. The compartment may be mounted on the side of the furnace. The compartment includes walls 4*a* and a bottom 4*b*. The interior surface 4*c* of the bottom may be at a same horizontal level as the interior surface 3*a* of the furnace vessel as illustrated in FIG. 2. The walls 4*a* of the compartment are sufficiently high to contain the molten metal. The walls of the compartment may be as high as the walls of the furnace vessel or may be shorter as in the embodiment shown in FIGS. 1 and 2.

The walls of the compartment may be made or any suitable material. If the furnace is being utilized to melt aluminum, the walls of the compartment may be made of steel. If the invention is utilized with other metals, other materials might be used. The walls may be lined with refractory material. Examples of refractory materials that may be utilized can include aluminium oxide based refractory materials or silicium carbide based refractory materials, among others.

To facilitate mixture of molten metal and submerging of solid metal in the molten metal, a plate 6 of refractory material or a metal plated clad with refractory material is arranged inside of the compartment. Any suitable material may be utilized in this location. According to one embodiment, the plate may be fixed to the sidewall of the compartment, leaving a clearance in the bottom so the metal can flow.

The refractory plate 6 may be oriented to achieve a desired mixing of molten metal and/or submerging of material into the molten metal. For example, the height of the refractory plate may be changed as well as the distance of the plate relative to one or more walls of the compartment. Additionally, the tilt of the refractory plate may be altered.

Typically, refractory plate is mounted in the extension compartment in an inclined position such that a gap between a side wall of the compartment is narrower toward a top of the compartment as compared to toward the bottom of the compartment, as in the embodiment illustrated in FIGS. 1 and 2. For example, there may be a first, narrow gap 9 between the top of the refractory plate and the side wall of the extension compartment distal to or further away from the furnace vessel. The may be a second, larger gap 8 between the refractory plate and the distal side wall of the extension compartment. The orientation of the refractory plate may be altered with respect to the distal side wall or the other side walls of the extension compartment. According to one embodiment, the refractory plate is at least 100 mm from the wall of the furnace vessel and at least 50 mm below the level of the top of the bath.

The refractory plate may be arranged movable or fixed inside the extension compartment. If the refractory plate is movable, the position of the plate may be moved during the operation of the furnace plant. This can help to optimize performance of the furnace plant as conditions change.

Typically, the refractory plate is positioned such that the upper edge of the plate is lower than the meniscus of molten metal inside the compartment. There is a gap between the refractory plate and the bottom of the extension in order to obtain a flow of molten metal from the extension and into the furnace. Typically, the gaps between the refractory plate and the side walls of the extension compartment that extend from the side wall of the furnace vessel are as small as possible to facilitate flow of the metal within the compartment and between the compartment and the furnace vessel.

To further facilitate operation of the invention, a wall 7 of refractory material may be arranged inside the furnace, adjacent to the top part of the refractory plate. The refractory wall may be attached in a number of different places. For example, the refractory wall could be attached to the walls of the extension compartment, walls of the furnace vessel and/or roof of the furnace vessel. The refractory wall typically is arranged such that it will be submerged into the molten metal. Positioned in this manner relative to the compartment, furnace vessel and refractory plate will help to prevent dross from entering the compartment. The position and orientation of the refractory wall may be altered to control flow of metal, as the level of molten metal in the furnace plant varies, and/or with changing orientation of the refractory plate.

One or more electromagnetic stirrers are positioned adjacent to the extension compartment. The one or more stirrers may be positioned adjacent one or more walls and/or the bottom of the extension compartment. The embodiment shown in FIGS. 1 and 2 includes one stirrer 5 arranged adjacent a wall of the extension compartment distal to the furnace vessel. A wall of the extension compartment that a stirrer is arranged adjacent may be made of austenitic steel in a furnace plant for melting aluminum.

A position of the one or more stirrers may be altered. For example, the height of any of stirrer arranged adjacent a side wall of the extension compartment may be adjustable. The stirrer may be oriented to operate downwards. In such an arrangement, the stirrer may generate a downwardly travelling electromagnetic field into the compartment containing molten metal. The magnetic field moves the molten metal downwards against the bottom of the compartment and further into the furnace.

The main stirring force, achieved by the stirrer, may be imposed in a first area (Area X) behind the refractory plate and below the meniscus of the molten metal held in the compartment. A second area (Area Y) is positioned below the meniscus and above the first area (Area X). Area Y may be made smaller by repositioning the refractory plate. This can make it possible to accelerate the velocity of molten metal at the meniscus in the compartment. Accelerating the molten metal in turn allows material added at the meniscus to be submerged into the molten metal. The acceleration is created by the principle of equal mass flow. According to equal mass flow, mass flow through Area Y is equal to mass flow through Area X, which is equivalent to Velocity 1*Area Y=Velocity 2*Area X.

Figure 3:
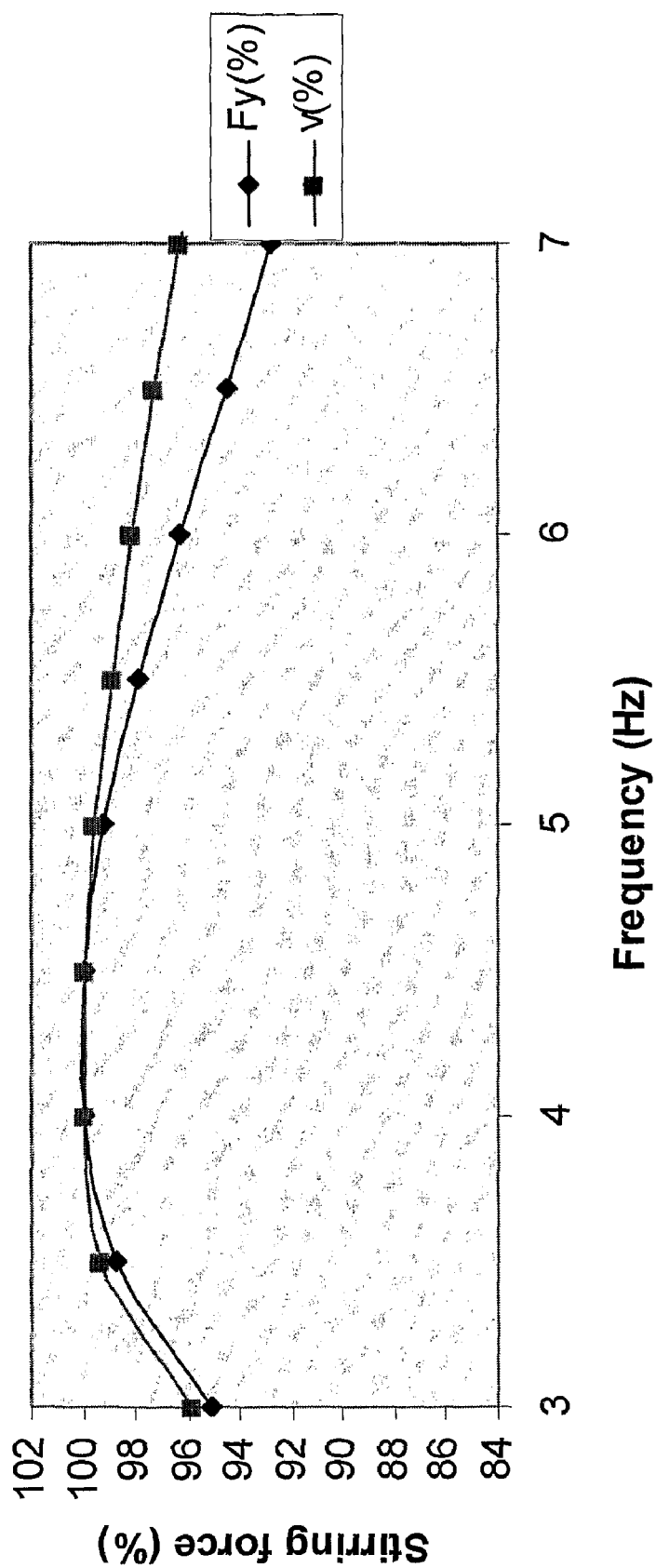
FIG. 3 is a graph that illustrates a relationship between stirring force and stirring frequency according to one embodiment of the invention.
Figure 4:
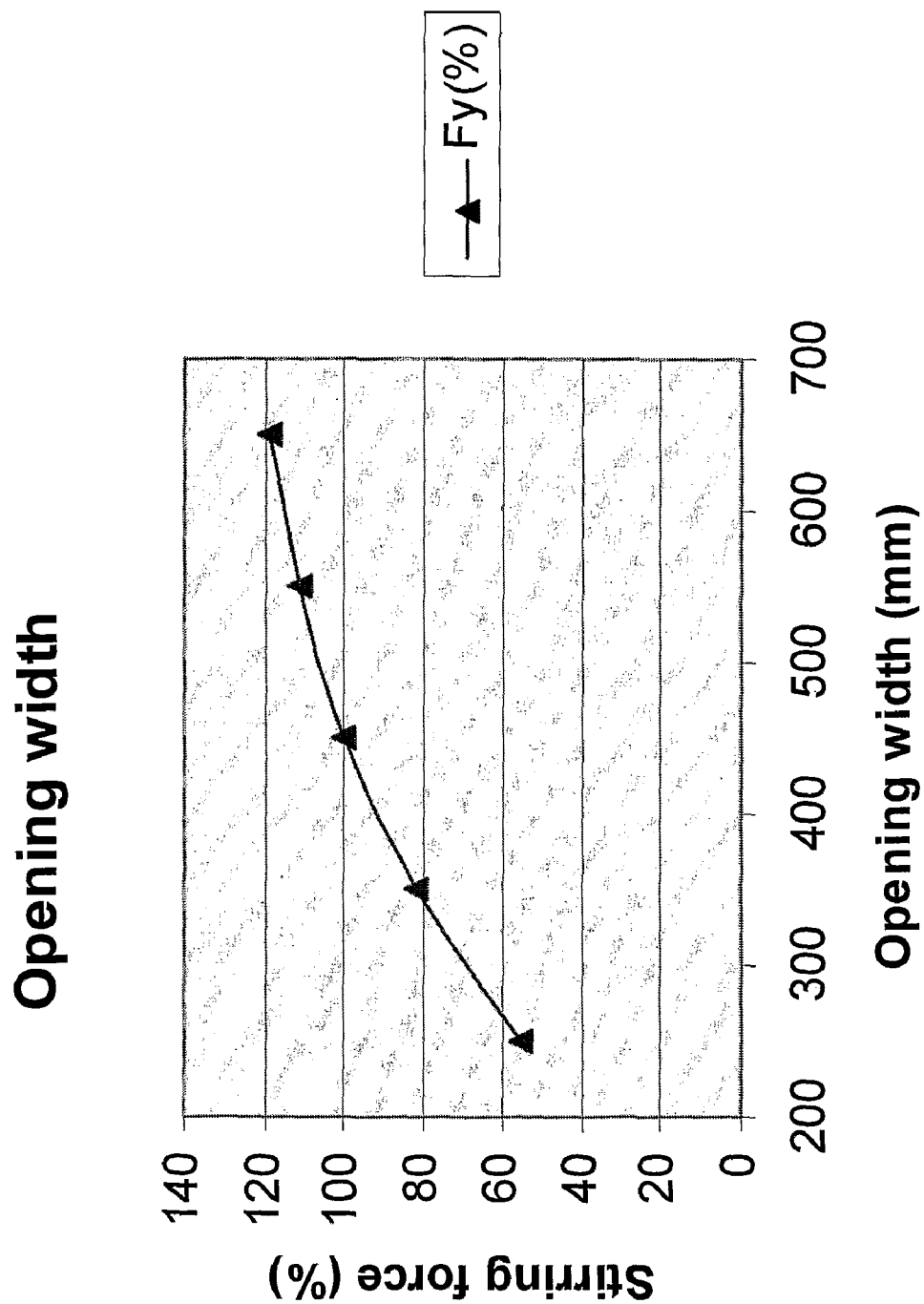
FIG. 4 is a graph that illustrates a relationship between stirring force and opening width according to one embodiment of the invention.
Figure 5:
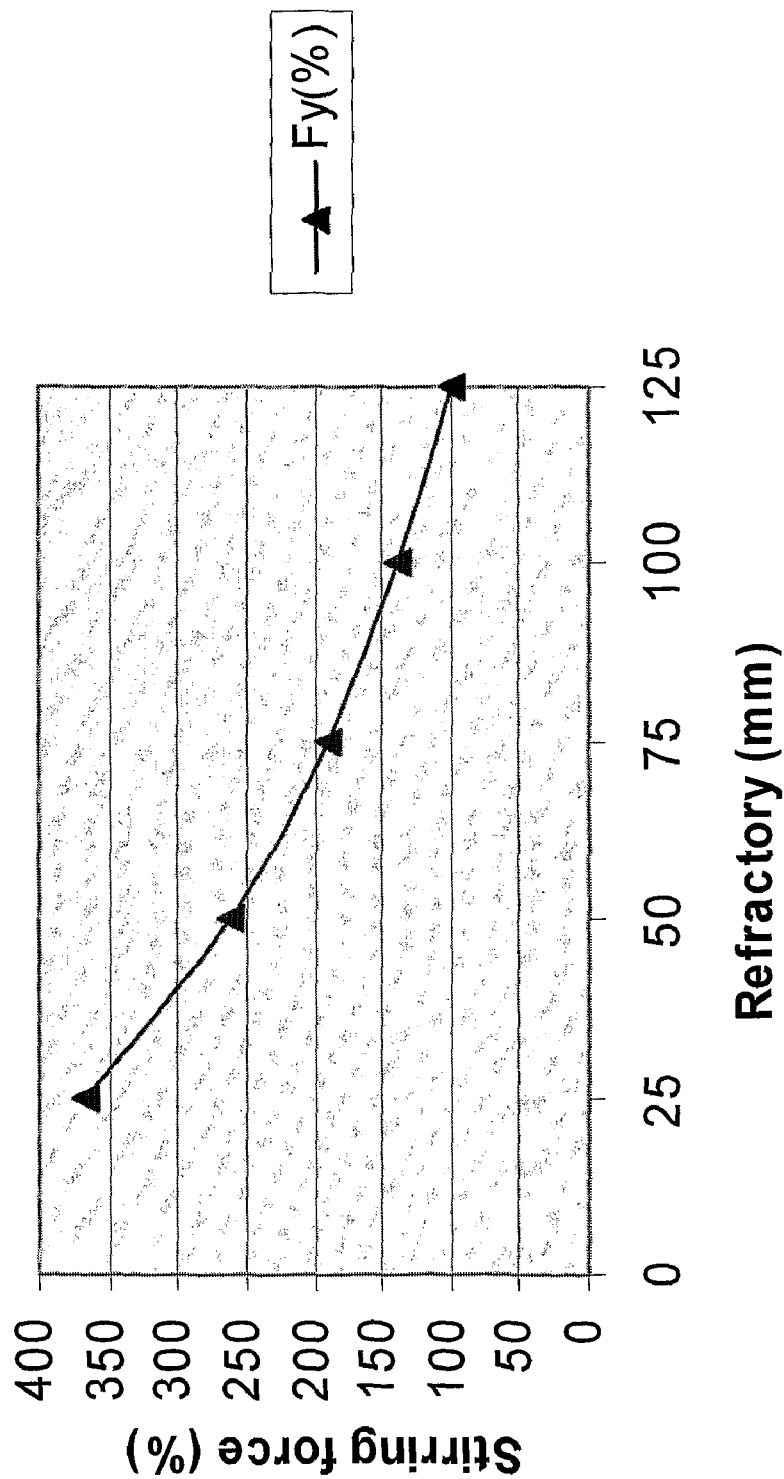
FIG. 5 is a graph that illustrates a relationship between stirring force and refractory thickness according to one embodiment of the invention.
Figure 6:
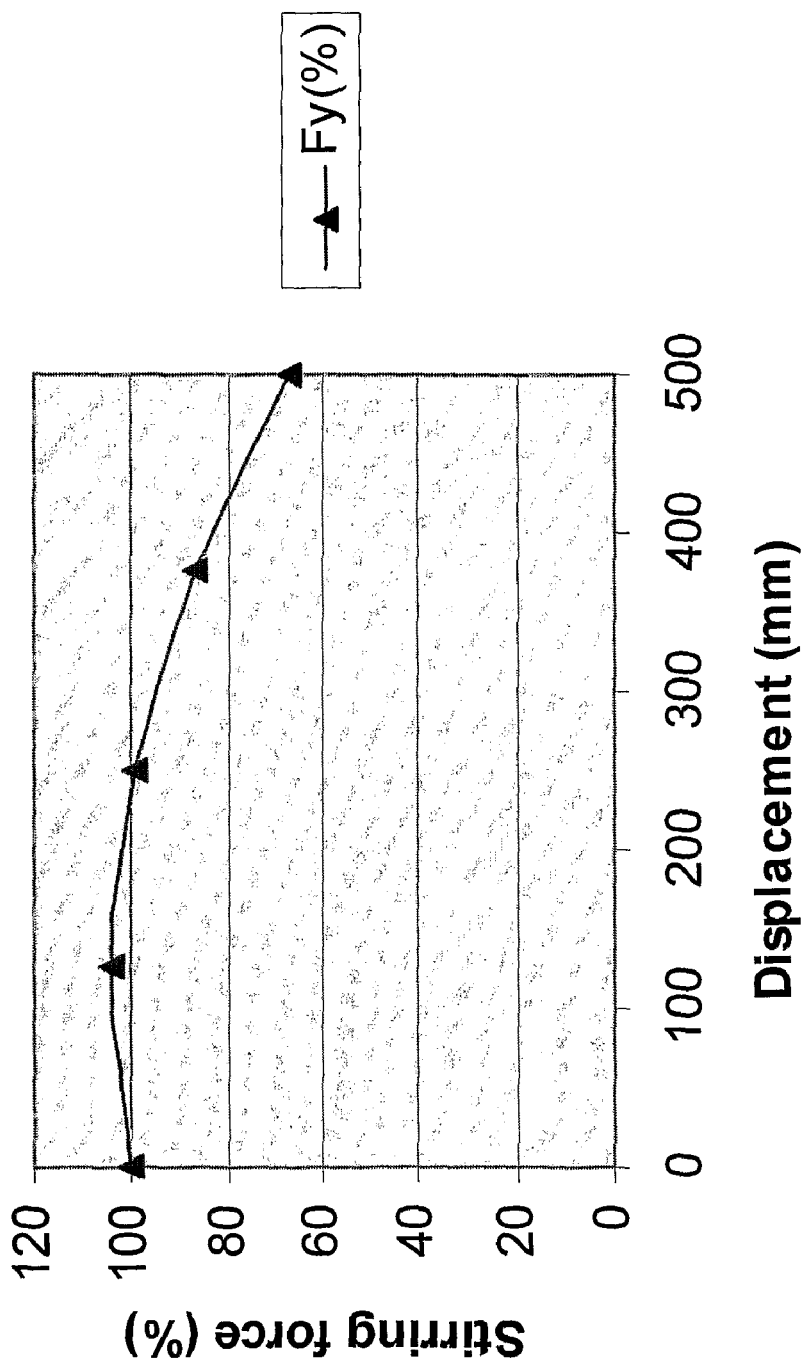
FIG. 6 is a graph that illustrates a relationship between stirring force and displacement according to one embodiment of the invention.

The stirring force exhibited by the stirrer(s) on the molten metal may vary with the frequency with which the stirrer(s). FIG. 3 illustrates a relationship between stirring force and stirring frequency according to one embodiment of the invention. Stirring force exhibited on the molten metal may also vary with the width of the opening in the compartment. FIG. 4 illustrates a relationship between stirring force and opening width according to one embodiment of the invention. Stirring force exhibited on the molten metal may also vary with the thickness of the refractory. FIG. 5 illustrates a relationship between stirring force and refractory thickness according to one embodiment of the invention. Stirring force exhibited on the molten metal may also vary with positioning of the stirrer relative to the vertical center of the compartment. FIG. 6 illustrates a relationship between stirring force and displacement according to one embodiment of the invention. According to one embodiment of the invention with the submerged refractory plate inclined with respect to the wall of the furnace vessel, the stirrer can generate a maximum velocity of about 2.7 m/s in downward stirring and about 3.2 m/s in upward stirring. According to another embodiment of the invention with the submerged refractory plate parallel to the wall of the furnace vessel, the stirrer can generate a maximum velocity of about 3.8 m/s in downward stirring.

By operating the electromagnetic stirrer upwards, the stirrer may impose an upwardly travelling electromagnetic field into the compartment, containing molten metal. This electromagnetic field moves the molten metal upwards against and over the top of the refractory plate and further back into the furnace.

Embodiments of the invention make it possible to use a common electromagnetic stirrer in order to create a high velocity of molten metal, in the compartment, at the meniscus sufficient to cause metal chips, swarf and other alloy elements to be easily submerged into the bath of molten metal in the compartment. Normally these types of materials do not sink under the meniscus by gravity alone. Rather, they float on the meniscus exposed to the surface environment, which oxidises the materials and causes losses in yield.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:
1. A furnace plant, comprising:
   at least one furnace vessel comprising side walls, a bottom and a roof;
   at least one heater configured to heat metal in the furnace vessel;
   a compartment comprising sidewalls lined with refractory material, the compartment forming an extension of the furnace vessel;
   at least one electromagnetic stirrer arranged outside and adjacent to the compartment; and
   a refractory plate arranged inside the compartment, the refractory plate comprising an upper edge configured to be positioned below a meniscus of molten metal and comprising a lower edge positioned spaced apart from a bottom of the compartment, the plate being arranged such that a gap between the plate and a sidewall of the compartment increases toward the bottom of the compartment.
2. The furnace plant according to claim 1, wherein the refractory plate is movable.
3. The furnace plant according to claim 1, wherein the refractory plate is fixed.
4. The furnace plant according to claim 1, further comprising:
   a refractory wall attached to the roof of the furnace vessel, wherein the refractory wall is arranged inside the furnace vessel adjacent to the upper edge of the refractory plate and to be partly submerged into the molten metal.
5. The furnace plant according to claim 4, wherein refractory wall is positioned to prevent dross from entering the compartment.
6. The furnace plant according to claim 1, wherein the at least one electromagnetic stirrer is arranged vertically or almost vertically and near the sidewall of the compartment.
7. The furnace plant according to claim 6, wherein a height of the electromagnetic stirrer is adjustable.
8. The furnace plant according to claim 1, wherein the at least one electromagnetic stirrer is arranged below and near the bottom of the furnace vessel to act through the bottom and apply a stirrer field to the molten metal present in the furnace vessel.
9. The furnace plant according to claim 1, wherein the sidewalls of the compartment comprise steel plate.
10. The furnace plant according to claim 1, wherein the sidewall of the compartment adjacent to the stirrer is distal to the furnace vessel.
11. The furnace plant according to claim 1, wherein the at least one stirrer comprises austenitic steel.
12. The furnace plant according to claim 1, wherein the sidewall of the compartment is adjacent to the stirrer.
13. A method for submerging material into liquid metal, the method comprising:
   feeding solid parts of metal into a melt pool of liquid metal inside a compartment comprising sidewalls, the compartment forming an extension to a furnace vessel, wherein a refractory plate is arranged in the compartment, the refractory plate being arranged such that a gap between the plate and a sidewall of the compartment increases toward the bottom of the compartment; and
   applying an electromagnetic force to the liquid metal in the compartment with a magnetic field generated by an electromagnetic stirrer installed near the sidewalls or near the bottom of the compartment.
14. The method according to claim 13, further comprising: moving the refractory plate.
15. The method according to claim 13, further comprising: maintaining the refractory plate in a fixed position.
16. The method according to claim 13, further comprising: arranging a refractory wall inside the furnace vessel adjacent to the upper edge of the refractory plate and partly submerged into the molten metal.
17. The method according to claim 16, wherein the refractory wall is positioned to prevent dross from entering the compartment.
18. The method according to claim 13, wherein the at least one electromagnetic stirrer is installed vertically or almost vertically and near the sidewall of the compartment.
19. The method according to claim 18, further comprising: adjusting a height of the electromagnetic stirrer.
20. The method according to claim 13, wherein the at least one electromagnetic stirrer is installed below and near the bottom of the furnace vessel to act through the bottom and apply a stirrer field to the molten metal present in the furnace vessel.
21. The method according to claim 13, wherein the sidewall of the compartment adjacent to the stirrer is distal to the furnace vessel.
22. The method according to claim 13, wherein the sidewall of the compartment is adjacent to the stirrer.

* * * * *